(12) United States Patent
Henry et al.

(10) Patent No.: US 6,606,768 B2
(45) Date of Patent: Aug. 19, 2003

(54) VERSATILE STRAP FOR RETAINING OBJECTS

(75) Inventors: Sebastien Henry, 718 Vinings Pkwy., Smyrna, GA (US) 30080; Renee Buisson Pultar, Montclair, NJ (US)

(73) Assignee: Sebastien Henry, Smyrna, GA (US)

( * ) Notice: Subject to any disclaimer, the term of this patent is extended or adjusted under 35 U.S.C. 154(b) by 0 days.

(21) Appl. No.: 10/072,740

(22) Filed: Feb. 8, 2002

(65) Prior Publication Data

US 2002/0104202 A1 Aug. 8, 2002

Related U.S. Application Data

(60) Provisional application No. 60/267,345, filed on Feb. 8, 2001.

(51) Int. Cl.$^7$ .................................................. A45F 5/00
(52) U.S. Cl. ........................ 24/306; 248/102; 446/227; 24/298; 24/3.13
(58) Field of Search ........................ 24/306, 442, 3.13, 24/298, 300, 301, 302; 294/25; 224/219, 901.2; 446/227; 248/102

(56) References Cited

U.S. PATENT DOCUMENTS

| | | | | |
|---|---|---|---|---|
| 2,539,698 A | * | 1/1951 | Pearson | |
| 3,977,638 A | * | 8/1976 | Woodard | 248/102 |
| 4,315,641 A | * | 2/1982 | Larsen | 224/219 X |
| 4,537,341 A | * | 8/1985 | Kelly | 224/620 |
| 4,564,957 A | * | 1/1986 | Scharf | 2/75 |
| 4,630,793 A | * | 12/1986 | Hunter | 248/102 |
| 4,858,249 A | * | 8/1989 | Stewart | 2/305 |
| 4,865,239 A | * | 9/1989 | Timbrook | 224/267 |
| 4,982,885 A | * | 1/1991 | Severson et al. | 224/901.4 X |
| 5,044,538 A | * | 9/1991 | Bader | 224/258 |
| D337,133 S | | 7/1993 | Olsen et al. | |
| 5,397,039 A | * | 3/1995 | Parcelles | 224/148.5 |
| 5,460,308 A | * | 10/1995 | Hahn | 224/257 |
| 5,582,335 A | * | 12/1996 | Beard et al. | 224/148.5 |
| 5,662,252 A | * | 9/1997 | Martin | 224/250 |
| 5,666,701 A | * | 9/1997 | Drummond | 24/302 |
| 5,715,571 A | | 2/1998 | Fasano | |
| 5,873,551 A | * | 2/1999 | Jones | 248/102 |
| 5,957,515 A | | 9/1999 | Van Der Sluys | |
| D426,699 S | | 6/2000 | Dickerson | |

* cited by examiner

Primary Examiner—Robert J. Sandy
(74) Attorney, Agent, or Firm—Sutherland Asbill & Brennan LLP (57) ABSTRACT

A strap device is provided for holding objects held by infants, for preventing the object from falling to the ground if released by the infant. The strap device includes a flexible strap having a first end with a first securing means, a second end with a second securing means, a first attachment means mounted on the flexible strap near the first end, and a second attachment means mounted on the flexible strap near the second end. The attachment means each can be releasably secured to a position on the flexible strap, forming a primary loop for securing the flexible strap to the object or to a support structure. The first securing means preferably is an elastic loop, which can attach the object to the strap device regardless of the object's shape and dimensions, while the second securing means attaches to a support near the infant for his use.

26 Claims, 6 Drawing Sheets

VERSATILE STRAP FOR RETAINING OBJECTS

CROSS-REFERENCE TO RELATED APPLICATIONS

Priority is claimed under 35 U.S.C. §119 to U.S. Ser. No. 60/267,345, filed Feb. 8, 2001.

FIELD OF THE INVENTION

The present invention generally relates to devices for use by infants, toddlers, and their caretakers to assist the child in holding objects, such as toys, pacifiers, and eating utensils.

BACKGROUND OF THE INVENTION

It is well known that infants and toddlers often drop objects, such as pacifiers, eating utensils, and toys, from their hands, whether purposefully or by accidentally losing their grip due to their underdeveloped manual dexterity. This dropping of objects to the ground typically necessitates cleaning the object before it can be reused, particularly objects intended for placement in the child's mouth. It is not uncommon for the dropping and cleaning process to be repeated often, much to the irritation of the child's parent or other caretaker. There is also the risk that the dropped object can be lost or otherwise irretrievable.

There are several known examples of straps that can be used to attach pacifiers to infants' clothes, or toys to a stroller, shopping cart, or high-chair, to prevent the attached objects from falling on the ground. See, e.g., U.S. Pat. No. 5,715,571. These straps, however, disadvantageously are designed to be used with a very narrow range of objects. Indeed, pacifier straps are limited to the sole purpose of securing a pacifier to an infant's clothes. As for straps meant to attach toys or other objects, their use is limited to objects with a ring or a handle-like feature around which these straps can be fastened. See, e.g., U.S. Pats. No. D426,699 and No. D337,133. Such straps are not suitable to attach other small objects that infants place in their mouth such as spoons or food items that infants teethe on. It is highly important that such objects do not fall on the ground, as they need, for the infant's safety, to remain unsoiled.

Another shortcoming of known straps is that they cannot be adjusted to any given length within the F963-96A ASTM requirements for cords and elastics (§4.13). These requirements also limit the range of supports to which these straps may be secured.

Other gripping devices, such as disclosed in U.S. Pat. No. 5,957,515, also are relatively complicated and not readily adaptable to a variety of objects and attachment points.

It is therefore an object of the present invention to provide an easy to use strap device, which is readily adaptable to secure a variety of objects, particularly toys, pacifiers, and utensil, to a variety of locations for use by small children.

These and other objects, features, and advantages of the present invention will become apparent upon review of the following detailed description of the invention taken in conjunction with the drawings and the appended claims.

SUMMARY OF THE INVENTION

An improved strap device is provided for holding objects commonly held by infants and for preventing the object from falling to the ground if dropped by the infant. The primary advantage of the present strap device is that essentially any commercially available baby spoon, regardless of size and shape, may be attached to the device and that a wide range of other objects that are commonly used by infants, such as pacifiers, teethers (i.e. teething rings), rattles and toys, may also be readily secured to the device.

The strap device includes (a) a slender, flexible strap having a first end and a second end distal the first end, (b) a first securing means integral or attached to the first end, (c) a second securing means integral or attached to the second end, (d) a first attachment means mounted on the flexible strap near the first end, (e) a second attachment means mounted on the flexible strap near the second end, wherein the first attachment means and the second attachment means each can be releasably secured to at least one position on the flexible strap, thereby forming a primary loop. The strap device preferably further includes third and fourth attachment means mounted on the flexible strap between the first attachment means and the second attachment means, wherein the first attachment means, the second attachment means, or both can be releasably secured to the third or fourth attachment means. One or more of the attachment means preferably are hook-and-loop fastener means, such as VELCRO™, although other attachment means such as snaps, clips, and clamps can be used.

The first and second securing means preferably are elastic loops, and desirably can be sized such that the first elastic loop of the first end has an opening through which the second end, second securing means, and flexible strap can be slid to form an adjustable loop. The length of the strap device should be less than 30.5 cm when the strap device is secured to the object, the child, or the nearby structure by means of the primary or adjustable loop. The flexible strap preferably has a width between about 0.5 cm and about 5.0 cm. The flexible strap optionally can include one or more decorative images.

These securing means, primary loops, and adjustable loops are used to secure the object to the child or nearby structure. By securing one end of the strap device to a support near the infant, such as a high chair or a stroller, and attaching the object for the infant to use to the other end of the device, the object may be dropped by the infant without falling on the ground. The object remains attached to the device and hangs from the support to which the device is attached. The strap advantageously eliminates the burden of having to pick up and clean a spoon or a toy every time the infant drops it. It also provides the infant with continual entertainment, as he or she can retrieve the dropped object, attached to the device, by simply pulling on the strap device.

Detailed Description of the Invention

A simple, versatile strap device has been developed to keep objects dropped by infants and toddlers from falling to the ground, thereby preventing the object from being soiled and enabling the child to readily retrieve the object by pulling the strap device toward himself or herself to bring the object to within the child's grasp.

The Strap Device

The strap device includes (a) a slender, flexible strap having a first end and a second end distal the first end, (b) a first securing means integral or attached to the first end, (c) a second securing means integral or attached to the second end, (d) a first attachment means mounted on the flexible strap near the first end, (e) a second attachment means mounted on the flexible strap near the second end, wherein the first attachment means and the second attachment means each can be releasably secured to at least one position on the flexible strap, thereby forming a primary loop. The strap device preferably further includes third and fourth attachment means mounted on the flexible strap between the first attachment means and the second attachment means, wherein the first attachment means, the second attachment means, or both can be releasably secured to the third or fourth attachment means.

Flexible Strap

The flexible strap can be made of a soft, durable fabric material, for example, cotton, nylon, polyester, or a combination, typically as a woven fabric. The flexible strap preferably is washable and stain resistant. For purposes of aesthetic appeal and/or marketing, the flexible strap can be made in a variety of colors and may further include designs or decorative images that are printed onto the flexible strap or integrated (e.g., woven) into the material forming the flexible strap. For example, the colors or designs may be specifically directed towards boys or girls (e.g., using blue or pink colors, respectively), or may be selected for use in celebrating a particular occasion, such as Halloween or Christmas. The possible designs and colors for the flexible strap are only limited by one's imagination and creativity.

The strap device preferably meets the F963-96A ASTM requirements for cords and elastics (§4.13). Therefore, the length of the flexible strap, along with the position of the attachment means mounted on the flexible strap, should be set so that the length of the strap device does not exceed 30.5 cm when the strap device is attached to a support by means of a primary or adjustable loop, as these loops are explained below with reference to FIGS. 3–9. The flexible strap also preferably has a width between about 0.5 cm and about 5.0 cm.

Securing Means Attached to Ends

The first and second securing means preferably are elastic loops, and can be sized such that the first elastic loop of the first end has an opening through which the second end, second securing means, and flexible strap can be slid to form an adjustable loop. The elastic loops preferably are made of a soft, washable, elastic material. The elastic loops are designed to hold small objects that do not have a handle, aperture, or other feature through which the primary loop can be secured. The elastic loop should be small enough so that it must be stretched to snugly fit around the object or portion thereof, thereby holding it securely (see FIG. 2). An attached object can be removed from the strap device simply by pulling it out of the elastic loop.

In a preferred embodiment, the elastic loops are of different sizes, e.g., have different sizes of openings from one another, thereby providing the user with a choice of elastic loops from which to select the best suited fit for the particular object the user wishes to secure to the strap device. By designing the loops of two different sizes, a wider range of objects, and virtually any commercially available baby spoon, may be attached to the strap device.

In other embodiments, additional elastic loops with different sizes and elastic properties may be attached at one or both ends of the strap device, so that an even wider range of objects in various sizes may be secured to the strap device. Such features also would allow several objects to be attached simultaneously to the same end of the strap device.

Securing means other than elastic loops also can be used. For example, the securing means can be a C-clamp or other type clamp, a clasp hook, a key ring, a rubber band, a VELCRO™ strap, a strap with snaps, suction cups, or other known, reusable connection devices. For example, a suction cup may be attached at one end of the strap device so that the strap device can be affixed to rigid flat surfaces such as a table or the tray of a highchair. These securing means optionally may be made to be removably attached to the strap device so that the user may choose the particular securing means based on the characteristics (shape, size, weight, material, etc.) of the particular object to be attached and/or the particular supporting structure to which the strap device is to be secured. Several of these securing means can be used simultaneously so that a plurality of objects can be attached to the strap device at the same time.

Attachment Means/Primary Loops/Adjustable Loops

One or more of the attachment means preferably are hook-and-loop fastener means, such as VELCRO™, although other releasably attachable attachment means such as snaps, clips, and clamps can be used.

Primary loops, which are described below with reference to FIGS. 3, 4, 10, and 11 (primary loop 37 and primary loop 34), have a dual purpose. For example, if objects are too large to be secured to the strap device using the securing means, then a primary loop may be used, for example to pass through an aperture in the device (see FIG. 4). A primary loop also can be used to secure the strap device to supporting structures that are not sized or shaped for attachment using the securing means (see FIG. 3). Hook-and-loop fasteners are preferred, since they are user-friendly. They allow for quick and easy fastening and unfastening of the attachment means.

In a preferred embodiment, the primary loops have the same size opening, that is, they are of the same length. Alternatively, the attachment means are mounted on the flexible strap at positions providing primary loops of different lengths.

In a preferred embodiment, the strap device is designed to also provide adjustable loops. In a most preferred embodiment, the securing means of at least one end of the strap device is an elastic loop having an opening through which the other end and flexible strap can be slid to form an adjustable loop. Adjustable loops are described below with reference to FIGS. 5–9 (adjustable loop 39 and adjustable loop 31). Similarly to the primary loops, the adjustable loops can be used to attach objects and to affix the strap device to a supporting structure. The adjustable loops advantageously can be contracted and expanded (e.g., in a lasso-like manner) to fit a wide size range of objects or supports, particularly ones that are too large or too small to snugly fit within an elastic loop securing means or a primary loop, or that do not have a handle or a ring around which primary loops may be conveniently fastened (see, e.g., FIG. 9).

The strap device having adjustable loops offers tremendous versatility. For example, the adjustable loops can be used to attach one end of the strap device around the arm or to the clothes of a person carrying an infant or around the arm or to the clothes of the infant herself while an object is attached at the other end. In the event the infant drops the object, the person carrying the infant can easily retrieve the object by pulling the flexible strap to "reel in" the object. This feature is particularly useful in public places that require an infant to be carried in the caretaker's arms, for example where strollers are not permitted or readily used.

Preferred Embodiments and Use Thereof

Figure 1:
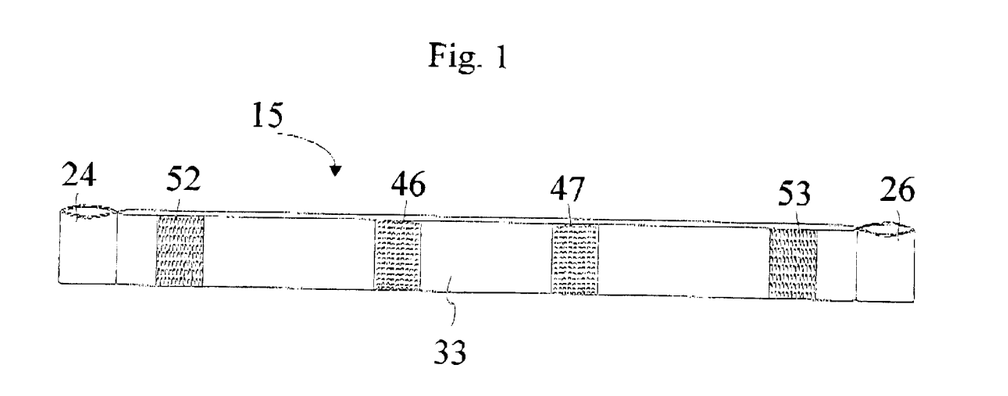
FIG. 1 is a perspective view of a preferred embodiment of the strap device.
Figure 2:
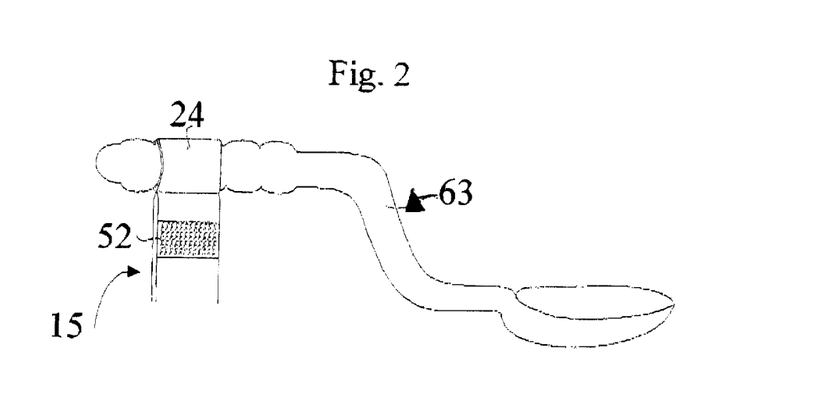
FIG. 2 is a perspective view of one end of the strap device of FIG. 1, showing how an elastic loop securing means can be used to attach a spoon to the device.

FIG. 1 illustrates a preferred embodiment of the strap device. Strap device 15 includes a slender, flexible strap 33 to which two securing means are integrated or attached: a first elastic loop 24 at the first end and a second elastic loop 26 at the second end of the flexible strap 33. The first elastic loop 24 and the second elastic loop 26 preferably are made of an elastic fabric material, an elastomeric polymer, or some combination thereof, and are designed to stretch and fit around objects, such as the handle of a baby spoon 63, so that objects may be secured to the strap device 15 as shown in FIG. 2.

The flexible strap 33 in FIG. 1 has four attachment means mounted thereon. The attachment means shown are hook-and-loop fastener means, which include first attachment means 52 and second attachment means 53 (both of which include a plurality of hooks), as well as third attachment means 46 and fourth attachment means 47 (both of which include a plurality of loops). Obviously, the positioning of the hooks and loops on the strap can be reversed. Such hook-and-loop fasteners are commercially available, for example, under the tradename VELCRO™.

Figures 3, 4:
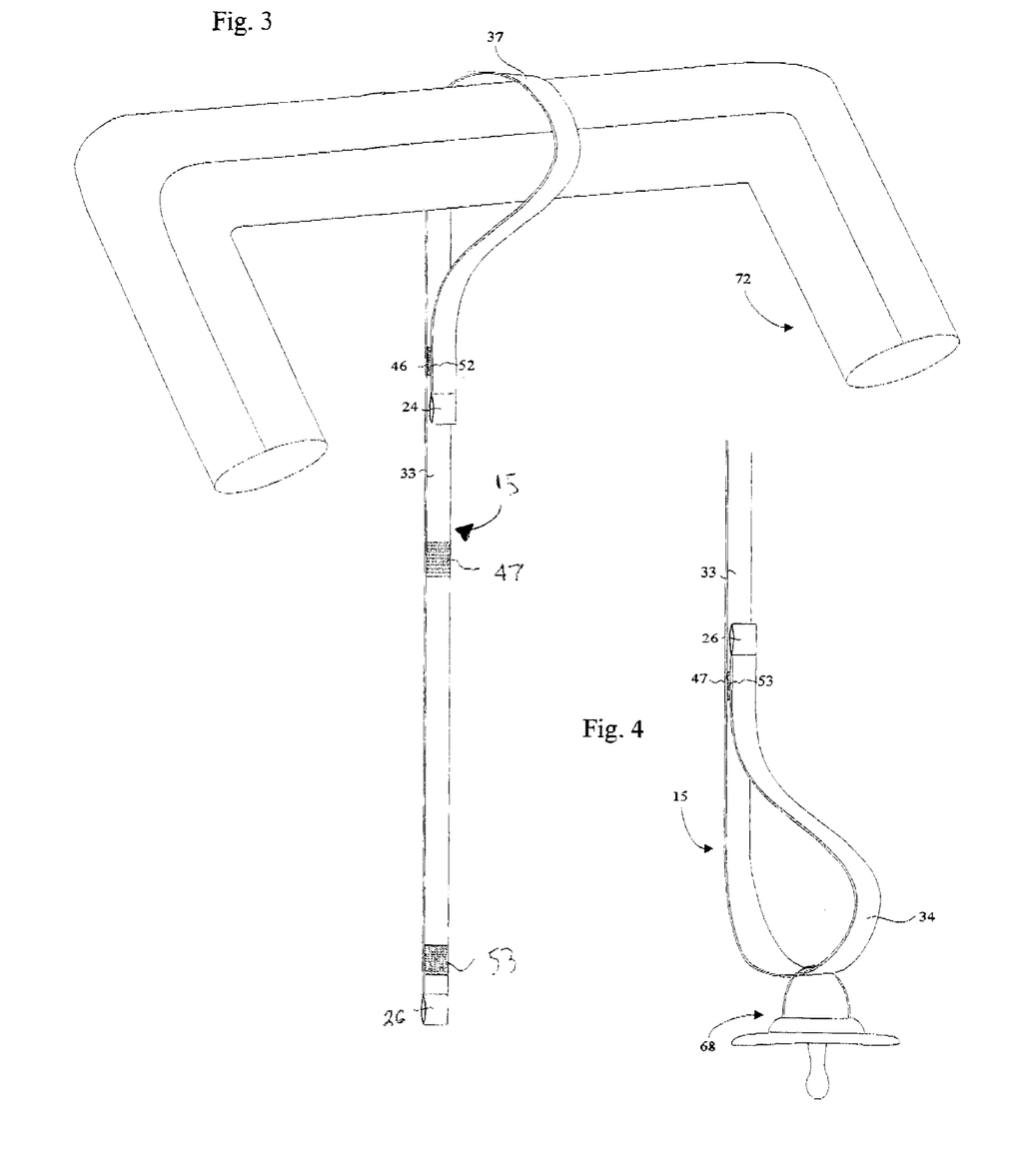
FIG. 3 is a perspective view of the strap device of FIG. 1, showing how a primary loop is formed and how it can be used to attach the device to a stroller handle.
FIG. 4 is a perspective view of one end of the strap device of FIG. 1, showing how a primary loop is formed and can be used to attach a pacifier to the device.

These hooks and loops interlock when pressed together. As shown in FIG. 3, when first attachment means 52 is secured to third attachment means 46, primary loop 37 is formed, for example, around stroller handle 72. Similarly as shown in FIG. 4, when second attachment means 53 is secured to fourth attachment means 47, primary loop 34 is formed, for example, around pacifier 68. The secured attachments are easily releasable as desired by the caretaker, for example by manually pulling the means apart; however, release typically would require coordination and strength beyond that found in infants and toddlers. Obviously, primary loop 37 and primary loop 34 can provide the attachment of a variety of other objects, such as rattles or other toys, to the strap device 15, and attachment of the strap device to a variety of other supporting structures, such as a highchair or grocery cart.

It is noted that the two pairs of hook and loop fasteners (52, 46) and (53, 47) can be attached on different sides of the strap. For example, first attachment means 52 and third attachment means 46 can be on one side of the strap, while second attachment means 53 and fourth attachment means 47 are on the other side of the strap. While not generally preferred, it is possible that the hooks can be on one side, while the loops are on the other side.

Figure 5:
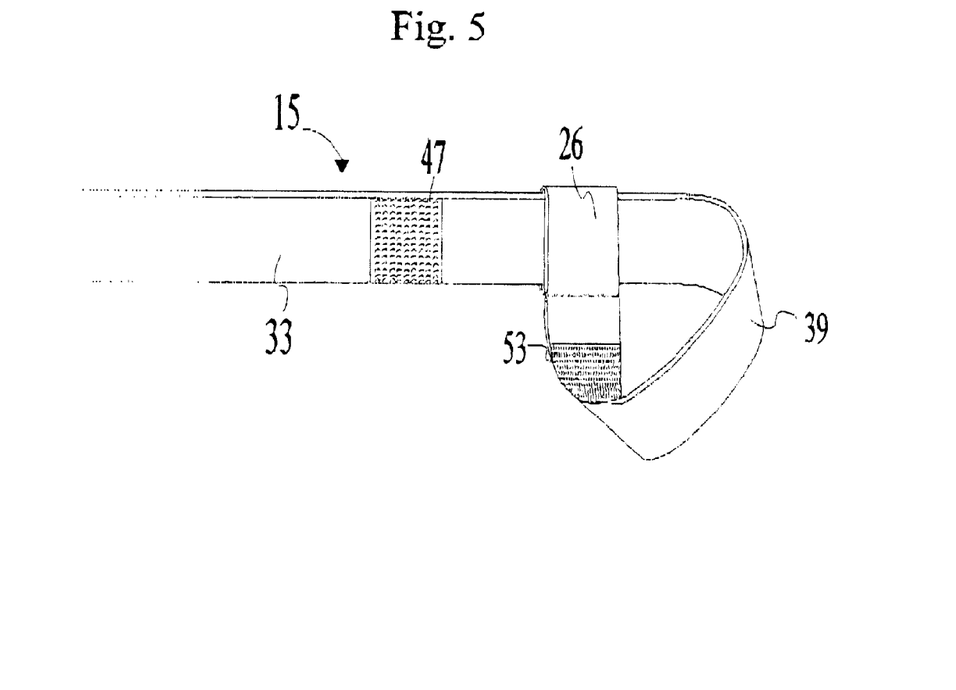
FIG. 5 is a perspective view of one end of the strap device of FIG. 1, showing how a first adjustable loop is formed.
Figure 6:
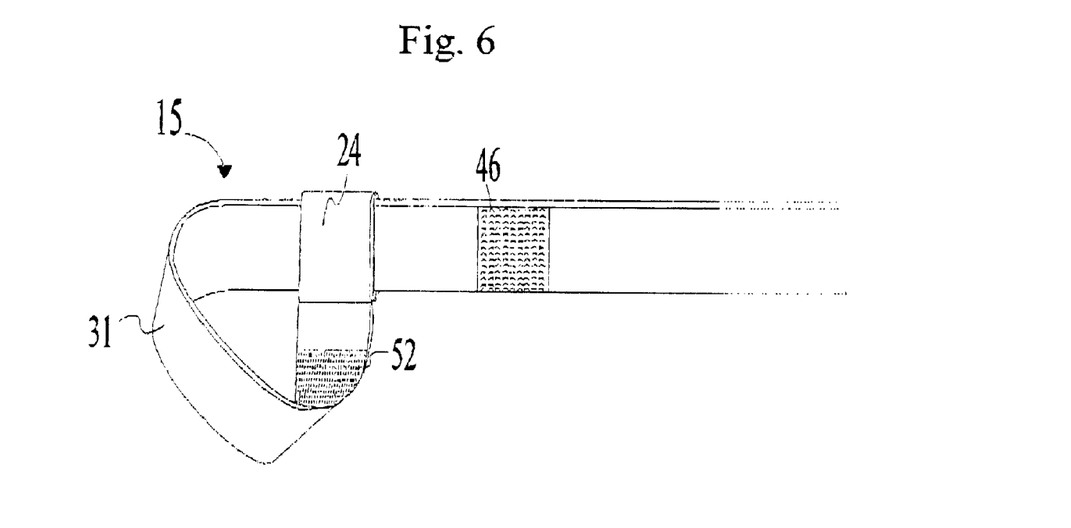
FIG. 6 is a perspective view of one end of the strap device of FIG. 1, showing how a second adjustable loop is formed.
Figures 7, 8:
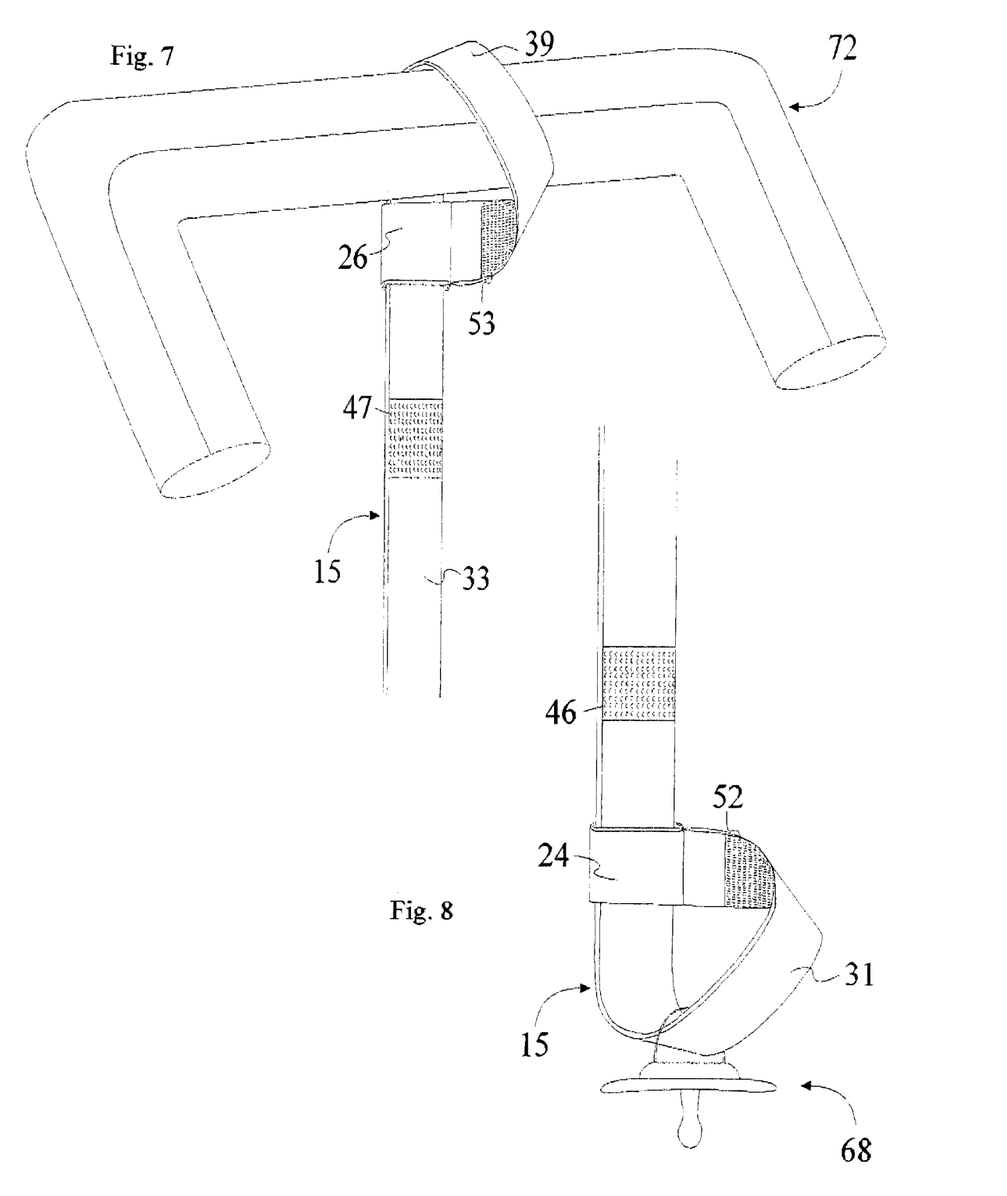
FIG. 7 is a perspective view of one end of the strap device of FIG. 1, showing how an adjustable loop can be used to attach the device to a stroller handle.
FIG. 8 is a perspective view of one end of the strap device of FIG. 1, showing how an adjustable loop can be used to attach a pacifier to the device.
Figure 9:
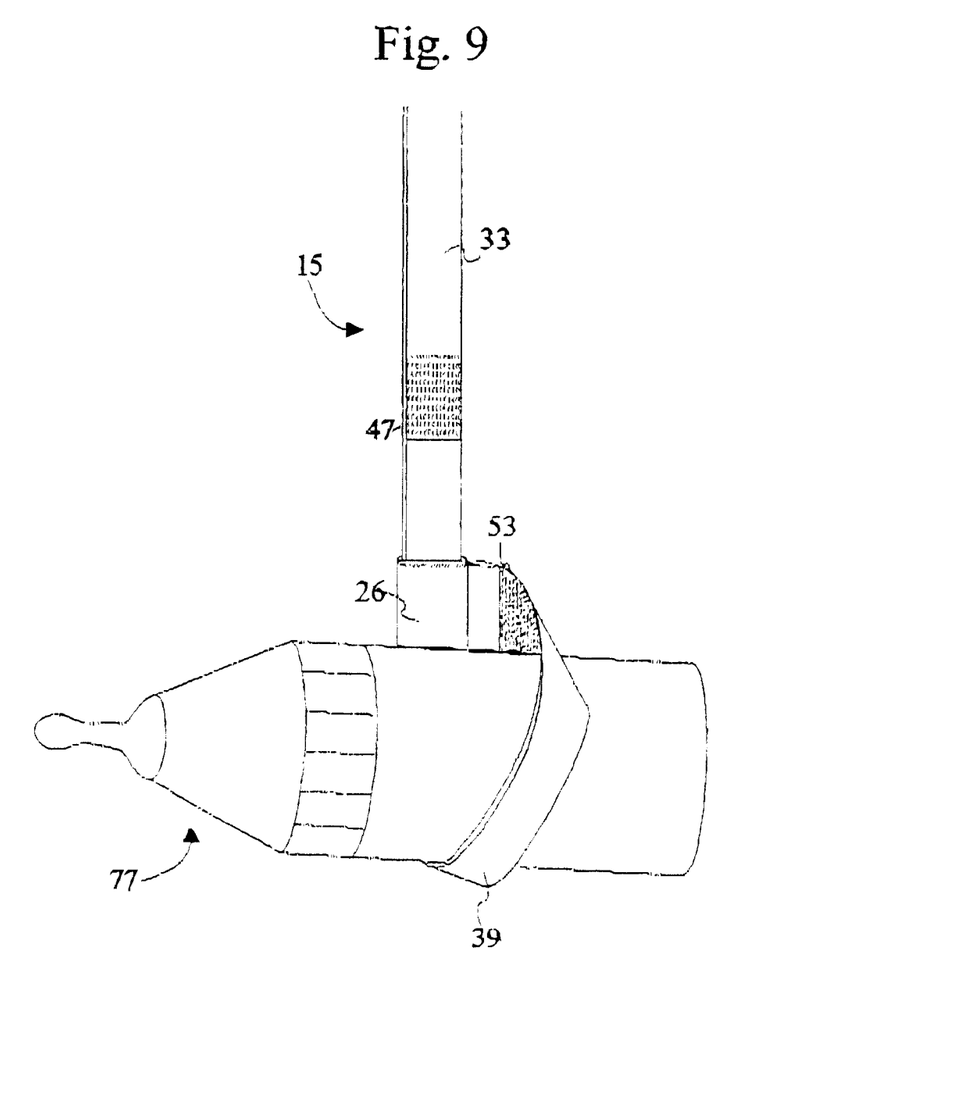
FIG. 9 is a perspective view of one end of the strap device of FIG. 1, showing how an adjustable loop can be used to attach a bottle to the device.

FIGS. 5 and 6 illustrate ends of strap device 15 which has adjustable loop 39 and adjustable loop 31, respectively. Adjustable loop 39 is formed by passing first elastic loop 24 through the opening of second elastic loop 26. Similarly, adjustable loop 31 is formed by passing second elastic loop 26 through the opening of first elastic loop 24. As shown in FIGS. 7 and 8, adjustable loop 39 can be employed to secure strap device 15, for example, around stroller handle 72, while adjustable loop 31 can be used to secure pacifier 68 to the strap device 15. Adjustable straps 31 and 39 are versatile enough to secure objects and support structures having a wide variety of shapes and sizes, including ones which do not have apertures or rings through which to pass a securing strap. As shown in FIG. 9, adjustable strap 39 can be adjusted to tightly fit around and secure a baby bottle 77.

First and second elastic loops 24, 26 at the ends of the strap 33 can be attached to the strap 33 by essentially any means known in the art. Representative examples of such means include stitching (i.e. sewing w/thread) and crimping metal eyelets.

Figure 10:
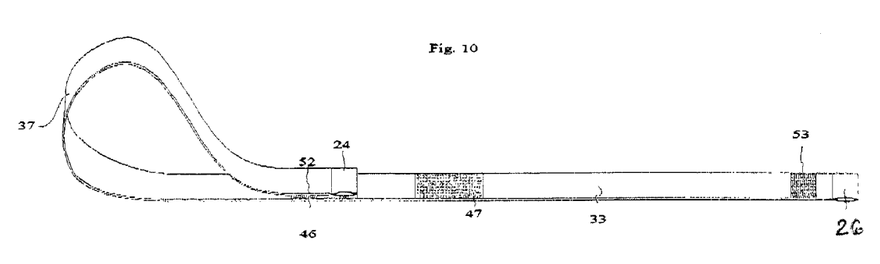
FIG. 10 is a perspective view of one embodiment of the strap device of FIG. 1 in which the pieces of a first loop fastener are wide enough to render the length of primary loops adjustable.
Figure 11:
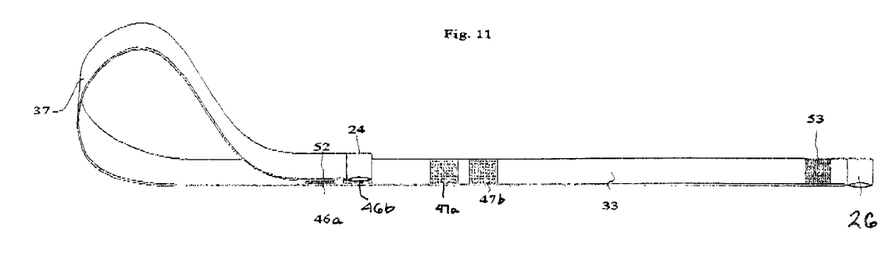
FIG. 11 is a perspective view of one embodiment of the strap device in which more than two attachment means are attached to the strap device so that the length of the primary loops is adjustable.

FIGS. 10 and 11 illustrate alternative embodiments of the strap device. The size of the primary loops can be made adjustable, preferably within the F963-96A ASTM requirements for cords and elastics (§4.13). For example, third attachment means 46 and fourth attachment means 47 can be larger (to cover more area on flexible strap 33) to permit first attachment means 52 to secure to third attachment means 46 at a range of positions along the surface of the latter, producing primary loop 37 in a corresponding range of sizes (see FIG. 10). Similarly, multiple individual attachment means can be substituted for either or both of the third and fourth attachment means. For example, third attachment means 46a and 46b and fourth attachment means 47a and 47b can be mounted on flexible strap 33 at spaced apart positions to permit first attachment means 52 to secure to third attachment means 46a (as shown in FIG. 11) or to other attachment means, producing primary loop 37.

Modifications and variations of the methods and devices described herein will be obvious to those skilled in the art from the foregoing detailed description. Such modifications and variations are intended to come within the scope of the appended claims.

We claim:

1. A strap device for securing an object to or near a child comprising:
   a slender, flexible strap having a first end and a second end distal the first end;
   a first securing means, which comprises a first elastic loop, integral or attached to the first end;
   a second securing means integral or attached to the second end;
   a first attachment means mounted on the flexible strap near the first end; and
   a second attachment means mounted on the flexible strap near the second end;
   wherein the first attachment means and the second attachment means each can be releasably secured to at least one position on the flexible strap, each thereby forming a primary loop.

2. The strap device of claim 1, wherein the first attachment means, the second attachment means, or both each comprise the hooks or the loops of a hook-and-loop fastener means.

3. The strap device of claim 2, further comprising a third attachment means mounted on the flexible strap between the first attachment means and the second attachment means, wherein the first attachment means, the second attachment means, or both can be releasably secured to the third attachment means.

4. The strap device of claim 3 further comprising a fourth attachment means mounted on the flexible strap been the first attachment means and the second attachment means, wherein the first attachment means, the second attachment means, or both can be releasably secured to the fourth at attachment means.

5. The strap device of claim 4, wherein the third attachment means, the fourth attachment means, or both comprise hook-and-loop fastener means.

6. The strap device of claim 1, wherein the length of the strap device, when the first or second attachment means is secured to said at least one position on the flexible strap, is 30.5 cm or less.

7. The strap device of claim 1, wherein the flexible strap has a width between about 0.5 cm and about 5.0 cm.

8. The strap device of claim 1, wherein the second securing means comprises a second elastic loop.

9. The strap device of claim 1, wherein the elastic loop has an opening through which the second securing means and flexible strap can be slid to form an adjustable loop.

10. The strap device of claim 4, wherein the third attachment means, the fourth attachment means, or both consist of a plurality of discrete attachment means spaced apart along the flexible strap.

11. The strap device of claim 1, wherein the flexible strap further comprises one or more decorative images.

12. The strap device of claim 1, wherein the second securing means, is selected from the group consisting of clamps, hooks, key rings, rubber bands, hook-and-loop fasteners, snaps, and suction cups.

13. The strap device of claim 12, further comprising one or more additional securing means mounted at the first end, the second end, or both ends of the flexible strap.

14. A strap device for securing an object to or near a child comprising:
   a slender, flexible strap having a first end and a second end distal the first end, said strap comprising a washable, woven fabric and having a width between about 0.5 and 5.0 cm;
   a first securing means integral or attached to the first end, wherein the first securing means comprises an elastic loop;
   a second securing means integral or attached to the second end, wherein the second securing means comprises elastic loop;
   a first attachment means mounted on the flexible strap near the first end, wherein the first attachment means comprises a plurality of the hooks or the loops of a hook-and-loop fastening means; and
   a second attachment means mounted on the flexible strap near the second end, wherein the first attachment means comprises a plurality of the hooks or the loops of a hook-and-loop fastening means; and
   a third attachment means integral or attached to the flexible strap at a position between the first attachment means and the second attachment means, wherein the third attachment means comprises a plurality of hooks or loops to mate with the loops or hooks, respectively, of the first attachment means, the second attachment means, or both.

15. A method of securing an object to a structure or a child for use by the child, the method comprising:
   securing an object to one end of a slender flexible strap having a first end and a second end distal the first end, a first securing means integral or attached to the first end, a second securing means integral or attached to the second end, a first attachment means mounted on the flexible strap near the first end, and a second attachment means mounted on the flexible strap near the second end, wherein the first attachment means and the second attachment means each can be releasably secured to at least one position on the flexible strap, each thereby forming a primary loop; and
   securing the other end of the strap to a structure near the child or to the child.

16. The method of claim 15, wherein the first securing means is selected from the group consisting of clamps, hooks, key rings, rubber bands, hook-and-loop fasteners, snaps, and suction cups.

17. The method of claim 15, wherein the securing of the object is conducted using to first securing means.

18. The method of claim 17, wherein the first securing means comprises an elastic loop around which the object or a portion thereof is snugly fit.

19. The method of claim 15, wherein the object comprises an aperture or ring, and wherein the securing of the object is conducted by passing the first end of the flexible strap through the aperture or ring, and releasably securing the first attachment means to said at least one position on the flexible strap to form a primary loop, which is interlocked with the aperture or ring.

20. The method of claim 15, wherein the first securing means comprises a first elastic loop having an opening through which the second securing means, the second end, and the flexible strap are slid to form adjustable loop.

21. The method of claim 20, wherein the securing of the object is conducted by placing the object or a portion thereof within the opening of the adjustable loop and then adjusting the position of the flexible strap within the first elastic loop so as to snugly fit the adjustable loop to the object or portion thereof.

22. The method of claim 20, wherein the object comprises an aperture or ring, and wherein the securing of the object is conducted by passing the second end of the flexible strap through the aperture or ring, prior to sliding the second securing means, the second end, and the flexible strap through the first elastic loop.

23. The method of claim 15, wherein the second securing means comprises a clip or clamp means, and wherein the securing of the other end is conducted by clipping or clamping the second end of the strap device the structure or to an article of clothing being worn by the child using the clip or clamp means.

24. The method of claim 15, wherein the second securing means comprises an elastic loop which, in securing of the other end, is snugly fit around a portion of the structure or child.

25. The method of claim 15, wherein the structure comprises an aperture or ring, and wherein the securing of the other end is conducted by passing the second end of the flexible strap through the aperture or ring is the structure, and releasably securing the second attachment means to the at least one position the flexible strap to form a primary loop, which is interlocked with the aperture or ring of the structure.

26. The method of claim 15, wherein the second securing means comprises a second elastic loop having an opening through which the first securing means, the first end, and the flexible strap are slid to form adjustable loop, and wherein the securing of the other end is conducted by placing the adjustable loop around a portion of the structure or child.

* * * * *